(12) United States Patent
Kim

(10) Patent No.: US 12,066,924 B2
(45) Date of Patent: Aug. 20, 2024

(54) VEHICLE INFOTAINMENT TEST DEVICE AND METHOD THEREOF

(71) Applicants: HYUNDAI MOTOR COMPANY, Seoul (KR); KIA CORPORATION, Seoul (KR)

(72) Inventor: Seong Un Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 78 days.

(21) Appl. No.: 17/731,339

(22) Filed: Apr. 28, 2022

(65) Prior Publication Data

US 2023/0133276 A1 May 4, 2023

(30) Foreign Application Priority Data

Nov. 2, 2021 (KR) .......................... 10-2021-0149256

(51) Int. Cl.
*G06F 11/00* (2006.01)
*G06F 11/36* (2006.01)

(52) U.S. Cl.
CPC ...... *G06F 11/3688* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 2014/0303756 A1* | 10/2014 | Tarnutzer | G06F 11/3688 700/83 |
| 2019/0050322 A1* | 2/2019 | Bhojan | G06N 20/00 |
| 2019/0066399 A1* | 2/2019 | Jiang | G07C 5/008 |
| 2019/0325672 A1* | 10/2019 | Stefan | G06F 30/20 |
| 2019/0370162 A1* | 12/2019 | Mandal | G06F 11/3692 |
| 2021/0056015 A1* | 2/2021 | Recktenwald | G06N 3/08 |
| 2023/0060213 A1* | 3/2023 | Sarkar | G06F 11/3688 |

OTHER PUBLICATIONS

Google Scholar/Patents search—text refined (Year: 2023).*
Google Scholar/Patents search—text refined (Year: 2024).*

* cited by examiner

*Primary Examiner* — Christopher S McCarthy
(74) *Attorney, Agent, or Firm* — Lempia Summerfield Katz LLC

(57) ABSTRACT

Disclosed are a vehicle infotainment test device and a method thereof. The vehicle infotainment test device includes: a storage that stores a test case for each module constituting a vehicle infotainment system, a test agent that manages input data and output data of each module, and a controller that applies the test case to each module by interworking with the test agent, and verifies the output data of each module received from the test agent based on the test case for each module.

14 Claims, 7 Drawing Sheets

| Abstract SIGNAL | Abstract VALUE | MSG | SIGNAL | VALUE |
|---|---|---|---|---|
| A1 | B1 | C1 | D1 | E1 |
| A2 | B2 | C2 | D2 | E2 |
| A3 | B3 | C3 | D3 | E3 |

FIG. 3

VEHICLE INFOTAINMENT TEST DEVICE AND METHOD THEREOF

CROSS-REFERENCE TO RELATED APPLICATION

This application claims priority to and the benefit of Korean Patent Application No. 10-2021-0149256, filed on Nov. 2, 2021, the entire contents of which are incorporated herein by reference.

TECHNICAL FIELD

The present disclosure relates to a technology capable of testing an error for each module constituting an infotainment system provided in a vehicle.

BACKGROUND

In general, infotainment is a compound word of information and entertainment, and refers to a device that provides information, audio and visual entertainment. In recent years, as telematics, connected car, and autonomous driving technologies have advanced, in-vehicle infotainment (IVI) goes beyond a simple multimedia device to inform the user of various information about the vehicle or to enable the user to directly control the vehicle.

A vehicle display that interworks with such a vehicle infotainment system may include a cluster, a head up display (HUD), a center information display, a passenger seat display, a side mirror display, and a rear seat entertainment display. In this case, the cluster and HUD have been mainly made in a real-time operating system (RTOS)-based software structure, but have been recently developed in an operating system (OS)-based modularized software structure for processing various images and data.

The conventional technique for testing the function of such a vehicle infotainment system has input a control signal to the vehicle infotainment system and has verified whether an error occurs in the vehicle infotainment system based on whether the output signal of the vehicle infotainment system corresponds to the control signal.

We have discovered that such a conventional technique may only detect whether an error has occurred in the vehicle infotainment system, and specifically may not detect which module has an error among each module constituting the vehicle infotainment system.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

An aspect of the present disclosure provides a vehicle infotainment test device and a method capable of detecting which module has an error among modules constituting a vehicle infotainment system. The vehicle infotainment test device includes: a test case for each module constituting a vehicle infotainment system and a test agent for managing input data and output data of each module, wherein the test case is applied to each module by interworking with the test agent, the output data of each module received from the test agent is verified based on the test case for each module.

The technical problems to be solved by the present disclosure are not limited to the aforementioned problems, and any other technical problems not mentioned herein should be clearly understood from the following description by those skilled in the art to which the present disclosure pertains. Also, it may be easily understood that the objects and advantages of the present disclosure may be realized by the units and combinations thereof recited in the claims.

According to an aspect of the present disclosure, a vehicle infotainment test device includes: storage that stores a test case for each module constituting a vehicle infotainment system, a test agent that manages input data and output data of each module, and a controller that applies the test case to each module by interworking with the test agent, and verifies the output data of each module received from the test agent based on the test case for each module.

According to an embodiment of the present disclosure, the test agent may be installed in the vehicle infotainment system.

According to an embodiment of the present disclosure, the controller may communicate with the test agent through Ethernet.

According to an embodiment of the present disclosure, the storage may store at least one of a test case of an abstraction layer, a test case of a function module, a test case of a human machine interface (HMI) app, and a test case of a graphic integrated circuit (IC).

According to an embodiment of the present disclosure, the controller may input test data to the abstraction layer, receive output data of the abstraction layer from the test agent, and compare the output data of the abstraction layer with reference data on the test case of the abstraction layer to determine whether the abstraction layer is normal.

According to an embodiment of the present disclosure, the controller may receive output data of the function module from the test agent when the abstraction layer is normal, and compare the output data of the function module with reference data on the test case of the function module to determine whether the function module is normal.

According to an embodiment of the present disclosure, the controller may receive output data of the HMI app from the test agent when the function module is normal, and compare the output data of the HMI app with reference data on the test case of the HMI app to determine whether the HMI app is normal.

According to an embodiment of the present disclosure, the controller may receive output data of the graphic IC from the test agent when the HMI app is normal, and compare the output data of the graphic IC with reference data on the test case of the graphic IC to determine whether the graphic IC is normal.

According to an embodiment of the present disclosure, the controller may classify a final display image that is the output data of the graphic IC for each UI component, and compare the output data of the graphic IC with reference data for each UI component to determine whether the graphic IC is normal.

According to an aspect of the present disclosure, a vehicle infotainment test method may include storing, by storage, a test case for each module constituting a vehicle infotainment system, managing, by a test agent, input data and output data of each module, and applying, by a controller, the test case to each module by interworking with the test agent, and verifying the output data of each module received from the test agent based on the test case for each module.

According to an embodiment of the present disclosure, the vehicle infotainment test method may include managing of the input data and output data includes installing the test agent in the vehicle infotainment system.

According to an embodiment of the present disclosure, the vehicle infotainment test method may include receiving output data of each module from the test agent through Ethernet.

According to an embodiment of the present disclosure, the vehicle infotainment test method may include storing at least one of a test case of an abstraction layer, a test case of a function module, a test case of a human machine interface (HMI) app, and a test case of a graphic integrated circuit (IC).

According to an embodiment of the present disclosure, the vehicle infotainment test method may include inputting test data to the abstraction layer, receiving output data of the abstraction layer from the test agent, and determining whether the abstraction layer is normal by comparing the output data of the abstraction layer with reference data on the test case of the abstraction layer.

According to an embodiment of the present disclosure, the vehicle infotainment test method may include receiving output data of the function module from the test agent when the abstraction layer is normal, and determining whether the function module is normal by comparing the output data of the function module with reference data on the test case of the function module.

According to an embodiment of the present disclosure, the vehicle infotainment test method may include receiving output data of the HMI app from the test agent when the function module is normal, and determining whether the HMI app is normal by comparing the output data of the HMI app with reference data on the test case of the HMI app.

According to an embodiment of the present disclosure, the vehicle infotainment test method may include receiving output data of the graphic IC from the test agent when the HMI app is normal, and determining whether the graphic IC is normal by comparing the output data of the graphic IC with reference data on the test case of the graphic IC.

According to an embodiment of the present disclosure, the vehicle infotainment test method may include classifying a final display image that is the output data of the graphic IC for each UI component, and determining whether the graphic IC is normal by comparing the output data of the graphic IC with reference data for each UI component.

Further areas of applicability should become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and advantages of the present disclosure should be more apparent from the following detailed description taken in conjunction with the accompanying drawings:

FIG. 3 is an exemplary view illustrating a test case of an abstraction layer provided in a vehicle infotainment test device according to an embodiment of the present disclosure;

Figure 1:
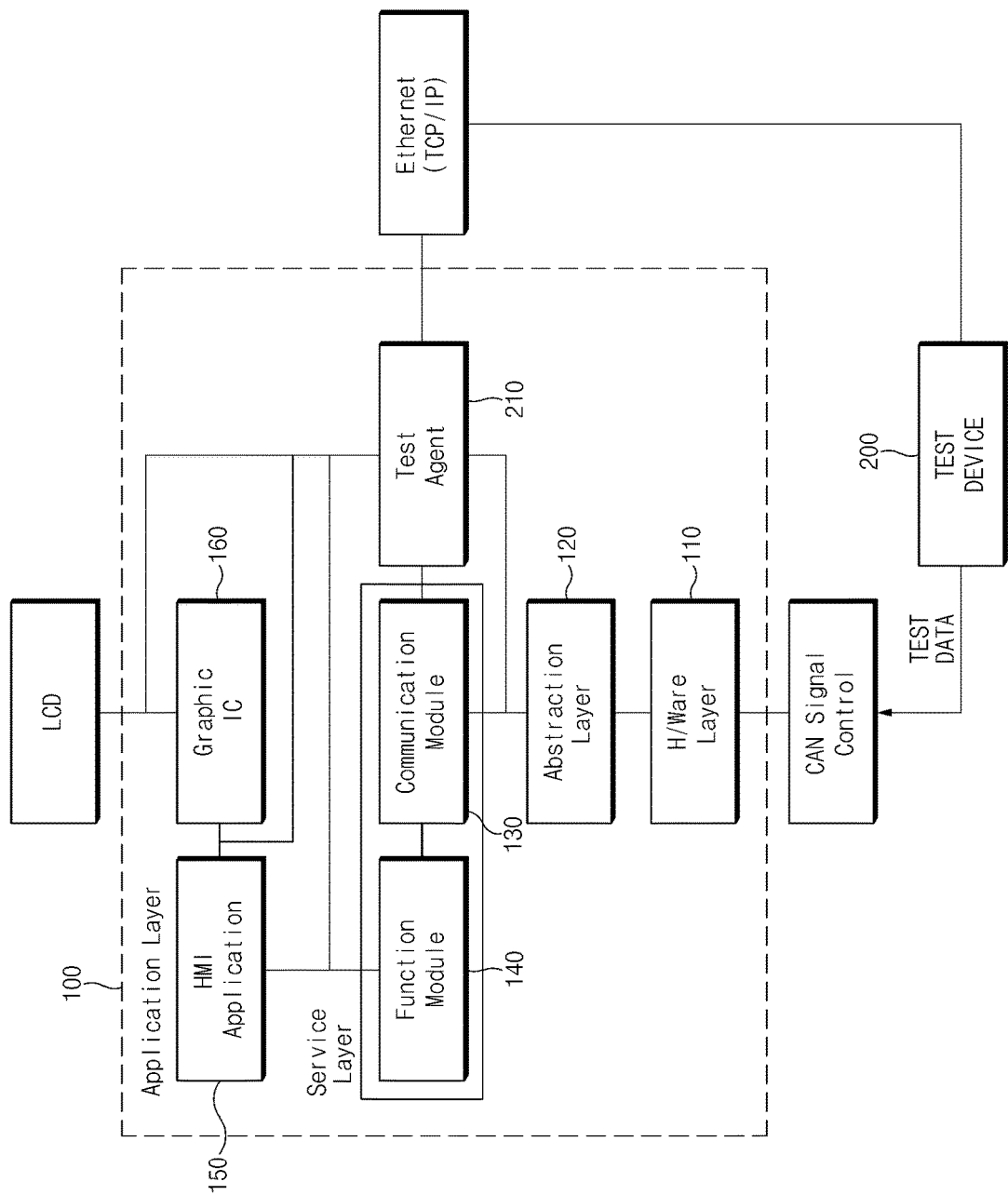
FIG. 1 is an exemplary view illustrating a vehicle infotainment system to which an embodiment of the present disclosure is applied.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function is omitted when it is determined that it interferes with the understanding of the embodiment of the present disclosure.

In describing the components of the embodiment according to the present disclosure, terms such as first, second, A, B, (a), (b), and the like may be used. These tams are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure pertains. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

As publicly known in the art, some of exemplary foams may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

FIG. 1 is an exemplary view illustrating a vehicle infotainment system to which an embodiment of the present disclosure is applied, and specifically shows a platform of a cluster or a platform of a HUD.

As shown in FIG. 1, a vehicle infotainment system 100 to which an embodiment of the present disclosure is applied may include a hardware layer 110, an abstraction layer 120, a communication module 130, a function module 140, a human machine interface application (HMI app) 150, a graphic integrated circuit (IC) 160, and a test agent 210. In this case, the abstraction layer may include a hardware abstraction layer and a software abstraction layer. In addition, the modules managed by the test agent 210 include the abstraction layer 120, the function module 140, the HMI app 150 and the graphic IC 160, which are described in detail below.

The abstraction layer 120 defines routines, protocols, and drivers for interacting with hardware. The abstraction layer 120 allows an application to be executed without detailed information on what operation the hardware performs. The abstraction layer 120 may allow software to operate independently of hardware.

The function module 140 outputs functional components corresponding to an abstraction variable and state values of the functional components based on the abstraction variable output from the abstraction layer 120. In this case, the communication module 130 serves to transmit the abstraction variable output from the abstraction layer 120 to the function module 140.

The HMI app 150 composes content by combining graphic components corresponding to the state value of each functional component based on the state value of each functional component output from the function module 140.

The graphic IC 160 generates a final display image to display the content composed by the HMI app 150 on a LCD.

The test agent 210, which is software installed in the vehicle infotainment system 100, may manage the input data and output data of the abstraction layer 120, the function module 140, the HMI app 150, and the graphic IC 160. The test agent 210 may communicate with a test device 200 through Ethernet.

The test agent 210 may collect abstraction variables output from the abstraction layer 120, and may transmit the collected abstraction variables to the test device 200 through Ethernet. In this case, the test agent 210 may input test data to the abstraction layer 120 based on the test case.

The test agent 210 may collect the state value of each functional component output from the function module 140, and transmit the collected state value of each functional component to the test device 200 through Ethernet. In this case, the test agent 210 may input the test data to the function module 140 based on the test case.

The test agent 210 may collect content (a combination of graphic components) output from the HMI app 150 and transmit the collected content to the test device 200 through Ethernet. In this case, the test agent 210 may input test data to the HMI app 150 based on the test case.

The test agent 210 may collect the final display image output from the graphic IC 160, and transmit the collected final display image to the test device 200 through Ethernet. In this case, the test agent 210 may input the test data to the graphic IC 160 based on the test case.

In another embodiment, the test device 200 may include a test case for each module constituting the vehicle infotainment system 100, and interwork with the test agent 210 to apply the test case to each module as the target. The test device 200 may verify the output data of each module received from the test agent 210 based on the test case for each module, and may detect which module has an error among the modules constituting the vehicle infotainment system 100.

The test device 200 may input a test signal (data) to the hardware layer 110 of the vehicle infotainment system 100 through a vehicle network, and interwork with the test agent 210 through Ethernet.

Figure 2:
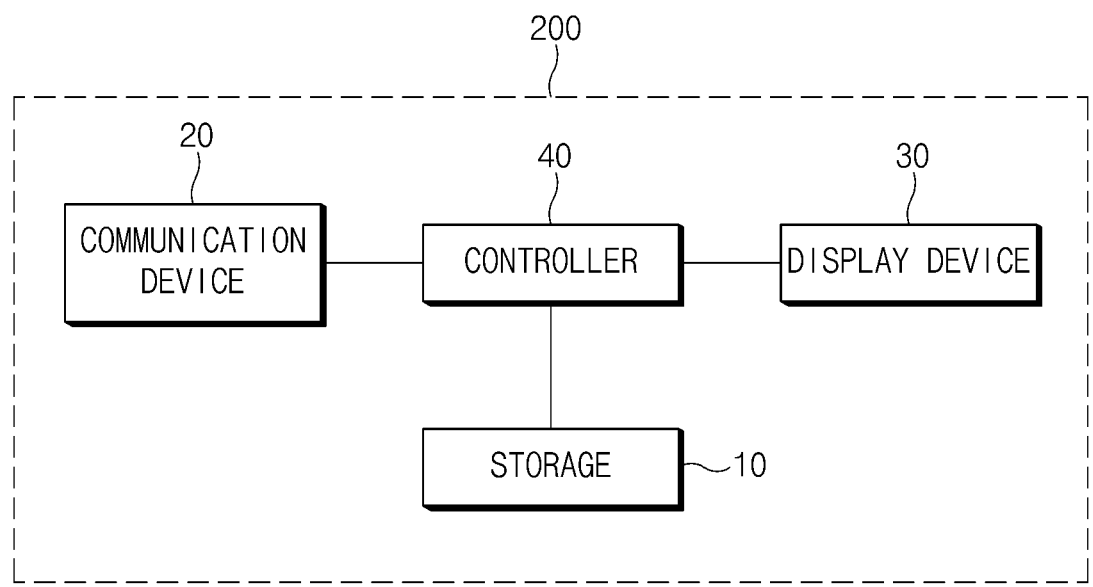
FIG. 2 is a block diagram illustrating a vehicle infotainment test device according to an embodiment of the present disclosure.

FIG. 2 is a block diagram illustrating a vehicle infotainment test device according to an embodiment of the present disclosure.

As illustrated in FIG. 2, the vehicle infotainment test device 200 according to an embodiment of the present disclosure may include storage 10, a communication device 20, a display device 30, and a controller 40. According to a scheme of implementing the vehicle infotainment test device 200, each component may be combined with each other to be implemented as one, or some components may be omitted.

In another embodiment, the storage 10 may store various logics, algorithms and programs that have a test case for each module constituting the vehicle infotainment system 100, interwork with the test agent 210 to apply the test case to each module, and are required in the process of verifying the output data of each module received from the test agent 210 based on the test case for each module. In this case, the vehicle infotainment system 100 may refer to a platform, and each module may include a hardware module as well as a software module on each layer.

The storage 10 may store a test case used in the process of testing the abstraction layer 120. Such a test case is as shown in FIG. 3 as an example. In FIG. 3, 'SIGNAL' and 'VALUE' represent test data (input data) input to the hardware layer 110, and 'Abstract SIGNAL' and 'Abstract VALUE' represent the output data (reference data) of the abstraction layer 120.

Figure 4:
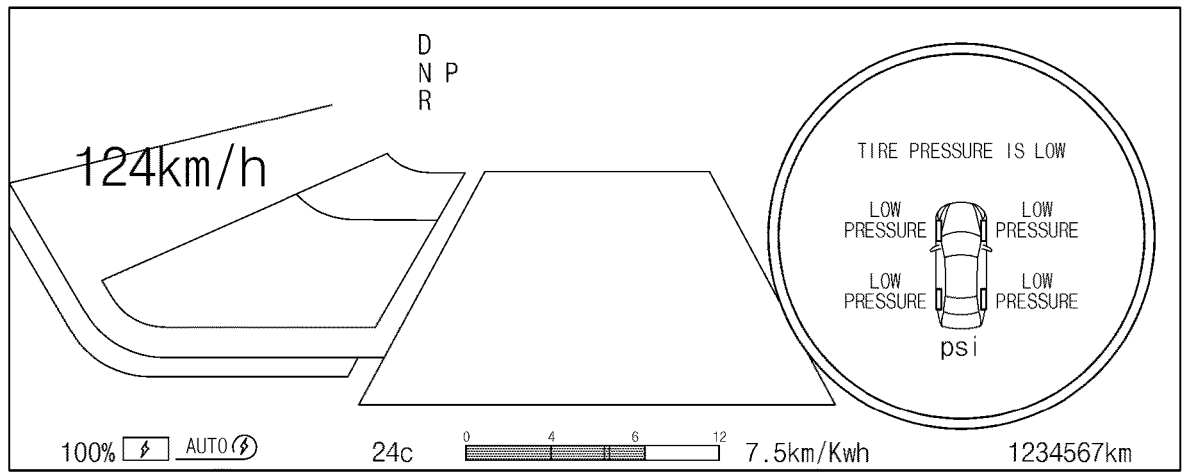
FIG. 4 is an exemplary view illustrating output data of a graphic IC received through a test agent by a controller provided in a vehicle infotainment test device according to an embodiment of the present disclosure.

The storage 10 may store the final display image output from the graphic IC 160. As an example, the final display image is as shown in FIG. 4, and may include speed, gear stage, tire pressure, accumulated mileage, indoor temperature, and state of charge (SOC) of a battery.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The communication device 20 may transmit a test signal (data) to the hardware layer 110 of the vehicle infotainment system 100 through the vehicle network, and may also interwork with the test agent 210 through Ethernet. In this case, the vehicle network may include a controller area network (CAN), a controller area network with flexible data-rate (CAN FD), a local interconnect network (LIN), FlexRay, media oriented systems transport (MOST), Ethernet, and the like.

The communication device 20 may include at least one of a mobile communication module, a wireless Internet module, and a short-range communication module in order to transmit the test result to an external server.

The mobile communication module may support communication with a server through a mobile communication network structured according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), and the like).

The wireless Internet module, which is a module for wireless Internet access, may support communication with a server through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication with a server by using at least one of Bluetooth™, radio frequency identification (RFID), infrared data association (IrDA), ultra wideband (UWB), ZigBee, near field communication (NFC), and wireless universal serial bus (wireless USB) technologies.

The display device 30 may provide a test result to a user.

The controller 40 may perform overall control such that each component can perform its function normally. The controller 40 may be implemented in the form of hardware or software, or a combination of hardware and software. In one form, the controller 40 may be implemented with a microprocessor, but is not limited thereto.

In one embodiment, the controller 40 may have a test case for each module constituting the vehicle infotainment system 100, interwork with the test agent 210 to apply the test case to each module, and perform various controls in the process of verifying the output data of each module received from the test agent 210 based on the test case for each module.

Hereinafter, the operation of the controller 40 is described in detail.

The controller 40 may test the abstraction layer 120 based on the test case of the abstraction layer 120 stored in the storage 10. That is, the controller 40 may input the test data to the abstraction layer 120 through a controller area network (CAN), receive the output data (e.g., abstraction variables) of the abstraction layer 120 from the test agent 210, and compare the output data with the reference data on the test case of the abstraction layer 120 to test whether the abstraction layer 120 is normal.

When it is determined that the abstraction layer 120 is normal, the controller 40 may test the function module 140 based on the test case of the function module 140 stored in the storage 10. That is, the controller 40 may receive the output data (e.g., state values of functional components) of the function module 140 from the test agent 210, and compare the output data with the reference data on the test case of the function module 140 to test whether the function module 140 is normal. In this case, the controller 40 may test only the function module 140 alone. In this case, the controller 40 should additionally perform a process of inputting test data (abstraction variables) on the test case of the function module 140 to the function module 140 through the test agent 210.

When it is determined that the function module 140 is normal, the controller 40 may test the HMI app 150 based on the test case of the HMI app 150 stored in the storage 10. That is, the controller 40 may receive the output data (e.g., a combination of graphic components) of the HMI app 150 from the test agent 210, and compare the output data with the reference data on the test case of the HMI app 150 to test whether the HMI app 150 is normal. In this case, the controller 40 may test only the HMI app 150 alone. In this case, the controller 40 should additionally perform a process of inputting the test data (state values of functional components) on the test case of the HMI app 150 to the HMI app 150 through the test agent 210.

When it is determined that the HMI app 150 is normal, the controller 40 may test the graphic IC 160 based on the test case of the graphic IC 160 stored in the storage 10. That is, the controller 40 may receive the output data (e.g., the final display image) of the graphic IC 160 from the test agent 210, and compare the output data with the reference data on the test case of the graphic IC 160 to test whether the graphic IC 160 is normal. In this case, the controller 40 may test only the graphic IC 160 alone. In this case, the controller 40 should additionally perform a process of inputting the test data (a combination of graphic components) on the test case of the graphic IC 160 to the graphic IC 160 through the test agent 210.

The controller 40 may verify the final display image by using an image similarity algorithm in the process of testing whether the graphic IC 160 is normal. In this case, the controller 40 may classify the final display image for each user interface (UI) component as shown in FIG. 4, and compare the final display image with the reference data on the test case for each UI component to determine whether the graphic IC 160 is normal.

Figure 5:
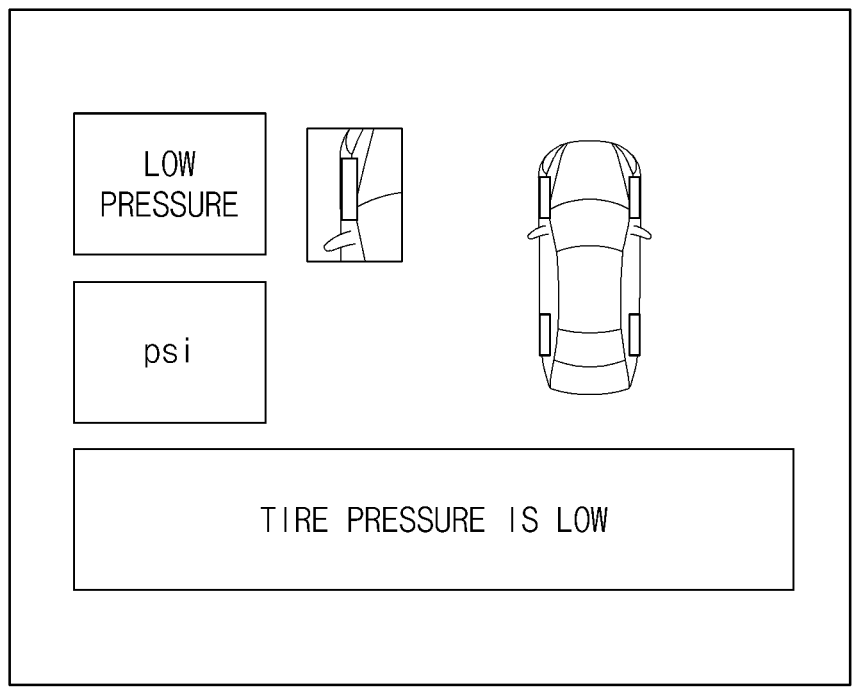
FIG. 5 is an exemplary view of UI components that a controller provided in a vehicle infotainment test apparatus according to an embodiment of the present disclosure distinguishes from a final display image output from a graphic IC.

FIG. 5 is an exemplary diagram illustrating the result of distinguishing the UI component from the final display image by the controller provided in a vehicle infotainment test device according to an embodiment of the present disclosure.

In FIG. 5, UI components for a tire pressure area are shown as an example, but UI components for various functional areas may be included.

Figure 6:
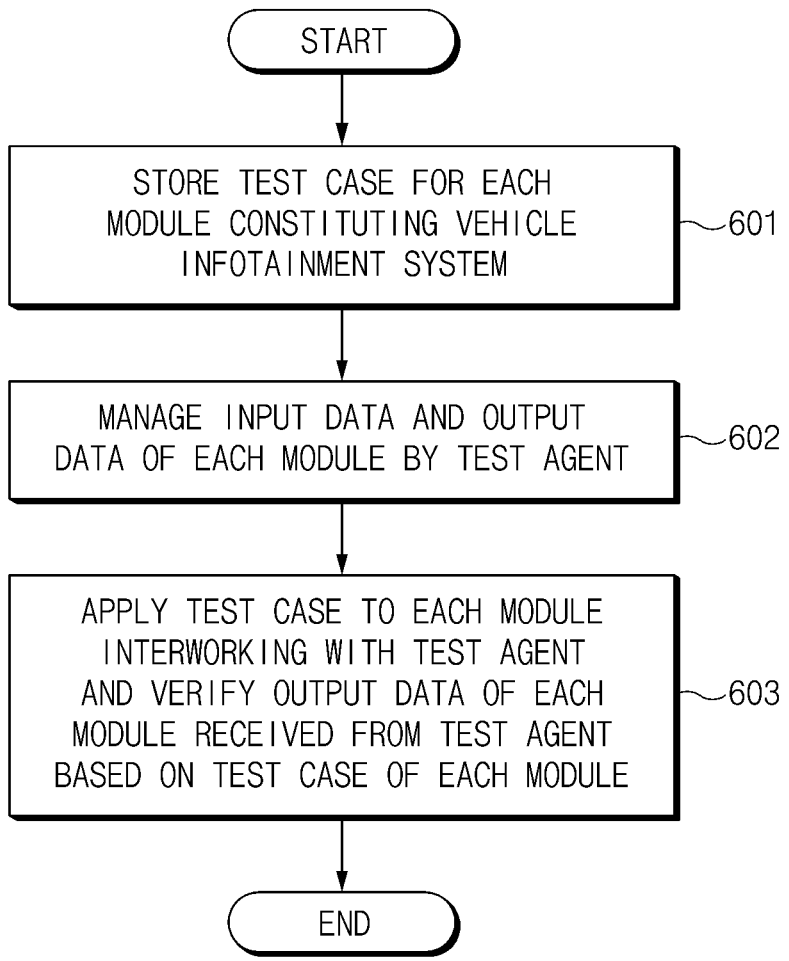
FIG. 6 is a flowchart illustrating a vehicle infotainment test method according to an embodiment of the present disclosure.

FIG. 6 is a flowchart illustrating a vehicle infotainment test method according to an embodiment of the present disclosure.

First, the storage 10 stores a test case for each module constituting the vehicle infotainment system in Step 601. In this case, the test case may include at least one of the test case of the abstraction layer, the test case of the function module, the test case of the HMI app, and the test case of the graphic IC.

In Step 602, the test agent 210 manages the input data and output data of each module.

Thereafter, in Step 603, the controller 40 applies the test case to each module by interworking with the test agent 210, and verifies the output data of each module received from the test agent 210 based on the test case for each module.

Figure 7:
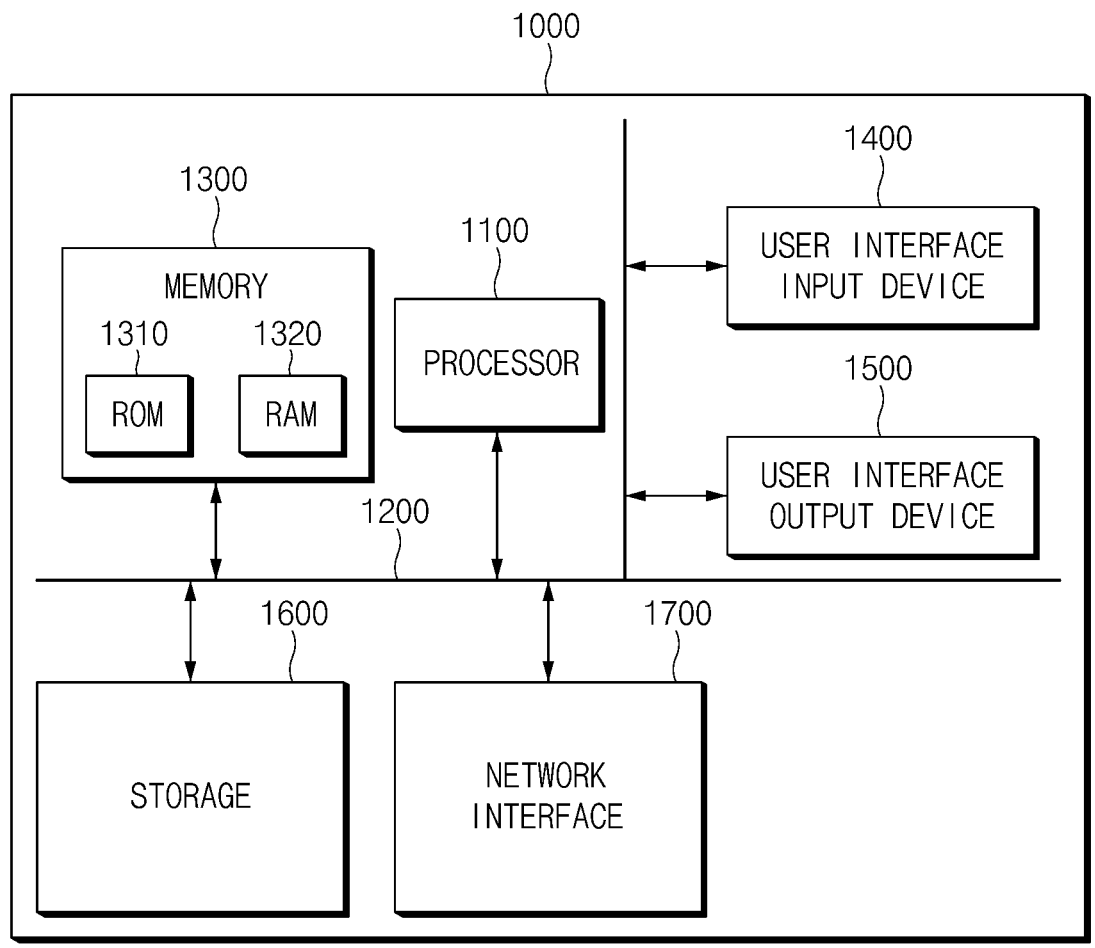
FIG. 7 is a block diagram illustrating a computing system for executing a vehicle infotainment test method according to an embodiment of the present disclosure.

FIG. 7 is a block diagram illustrating a computing system for executing a vehicle infotainment test method according to an embodiment of the present disclosure.

Referring to FIG. 7, the above-described vehicle infotainment test method according to an embodiment of the present disclosure may be implemented through a computing system. A computing system 1000 may include at least one processor 1100, a memory 1300, a user interface input device 1400, a user interface output device 1500, a storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another form, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the vehicle infotainment test device and method of the present disclosure, it is possible to detect which module has an error among modules constituting a vehicle infotainment system. The vehicle infotainment test device includes: a test case for each module constituting a vehicle infotainment system, and a test agent for managing input data and output data of each module, and the test case is applied to each module by interworking with the test agent. The output data of each module received from the test agent is verified based on the test case for each module.

Although exemplary embodiments of the present disclosure have been described for illustrative purposes, those having ordinary skill in the art should appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure.

What is claimed is:

1. A vehicle infotainment test device comprising:
a storage configured to store a test case for each module of a plurality modules of a vehicle infotainment system;
a test agent configured to manage input data and output data of the each module of the plurality modules; and
a controller configured to: apply the test case to the each module of the plurality modules by interworking with the test agent and verify the output data of the each module of the plurality modules received from the test agent based on the test case,
wherein the controller is configured to:
input test data to an abstraction layer,
receive output data of the abstraction layer from the test agent,
compare the output data of the abstraction layer with reference data on a test case of the abstraction layer to determine whether the abstraction layer is normal,
receive output data of a function module from the test agent when the abstraction layer is normal, and
compare the output data of the function module with reference data on a test case of the function module to determine whether the function module is normal.

2. The vehicle infotainment test device of claim 1, wherein the test agent is installed in the vehicle infotainment system.

3. The vehicle infotainment test device of claim 2, wherein the controller is configured to communicate with the test agent through Ethernet.

4. The vehicle infotainment test device of claim 1, wherein the storage is configured to store at least one of the test case of the abstraction layer, the test case of the function module, a test case of a human machine interface (HMI) app, and a test case of a graphic integrated circuit (IC).

5. The vehicle infotainment test device of claim 1, wherein the controller is configured to:
receive output data of an HMI app from the test agent when the function module is normal, and
compare the output data of the HMI app with reference data on the test case of the HMI app to determine whether the HMI app is normal.

6. The vehicle infotainment test device of claim 5, wherein the controller is configured to:
receive output data of a graphic IC from the test agent when the HMI app is normal, and
compare the output data of the graphic IC with reference data on the test case of the graphic IC to determine whether the graphic IC is normal.

7. The vehicle infotainment test device of claim 6, wherein the controller is configured to:
classify a final display image that is the output data of the graphic IC for a user interface (UI) component, and
compare the output data of the graphic IC with reference data for the UI component to determine whether the graphic IC is normal.

8. A vehicle infotainment test method comprising:
storing, by a storage, a test case for each module of a plurality modules constituting a vehicle infotainment system;
managing, by a test agent, input data and output data of the each module of the plurality modules; and
applying, by a controller, the test case to the each module of the plurality modules by interworking with the test agent, and verifying the output data of the each module of the plurality modules received from the test agent based on the test case,
wherein the verifying of the output data includes:
inputting test data to an abstraction layer;
receiving output data of the abstraction layer from the test agent;
determining whether the abstraction layer is normal by comparing the output data of the abstraction layer with reference data on a test case of the abstraction layer;
receiving output data of a function module from the test agent when the abstraction layer is normal; and
determining whether the function module is normal by comparing the output data of the function module with reference data on a test case of the function module.

9. The vehicle infotainment test method of claim 8, wherein the managing of the input data and output data includes installing the test agent in the vehicle infotainment system.

10. The vehicle infotainment test method of claim 9, wherein the verifying of the output data includes:
receiving output data of the each module of the plurality modules from the test agent through Ethernet.

11. The vehicle infotainment test method of claim 8, wherein the storing of the test case includes:

storing at least one of the test case of the abstraction layer, the test case of the function module, a test case of a human machine interface (HMI) app, and a test case of a graphic integrated circuit (IC).

12. The vehicle infotainment test method of claim 8, wherein the verifying of the output data includes:
receiving output data of an HMI app from the test agent when the function module is normal; and
determining whether the HMI app is normal by comparing the output data of the HMI app with reference data on the test case of the HMI app.

13. The vehicle infotainment test method of claim 12, wherein the verifying of the output data includes:
receiving output data of a graphic IC from the test agent when the HMI app is normal; and
determining whether the graphic IC is normal by comparing the output data of the graphic IC with reference data on the test case of the graphic IC.

14. The vehicle infotainment test method of claim 13, wherein the determining of whether the graphic IC is normal includes:
classifying a final display image that is the output data of the graphic IC for a user interface (UI) component; and
determining whether the graphic IC is normal by comparing the output data of the graphic IC with reference data for the UI component.

* * * * *